Oct. 21, 1924.
J. BAGOS
1,512,075
VEHICLE DRAWBAR
Filed Feb. 23, 1923     3 Sheets-Sheet 3
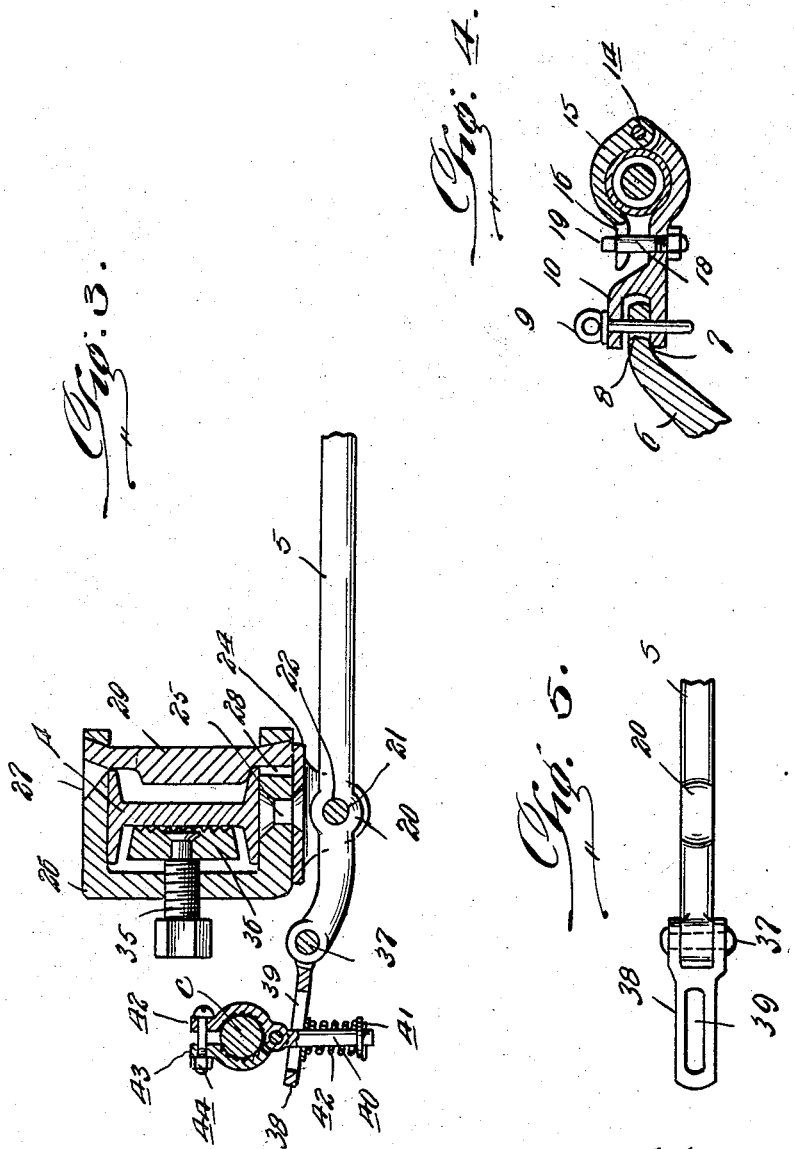
John Bagos,
Inventor Patented Oct. 21, 1924.

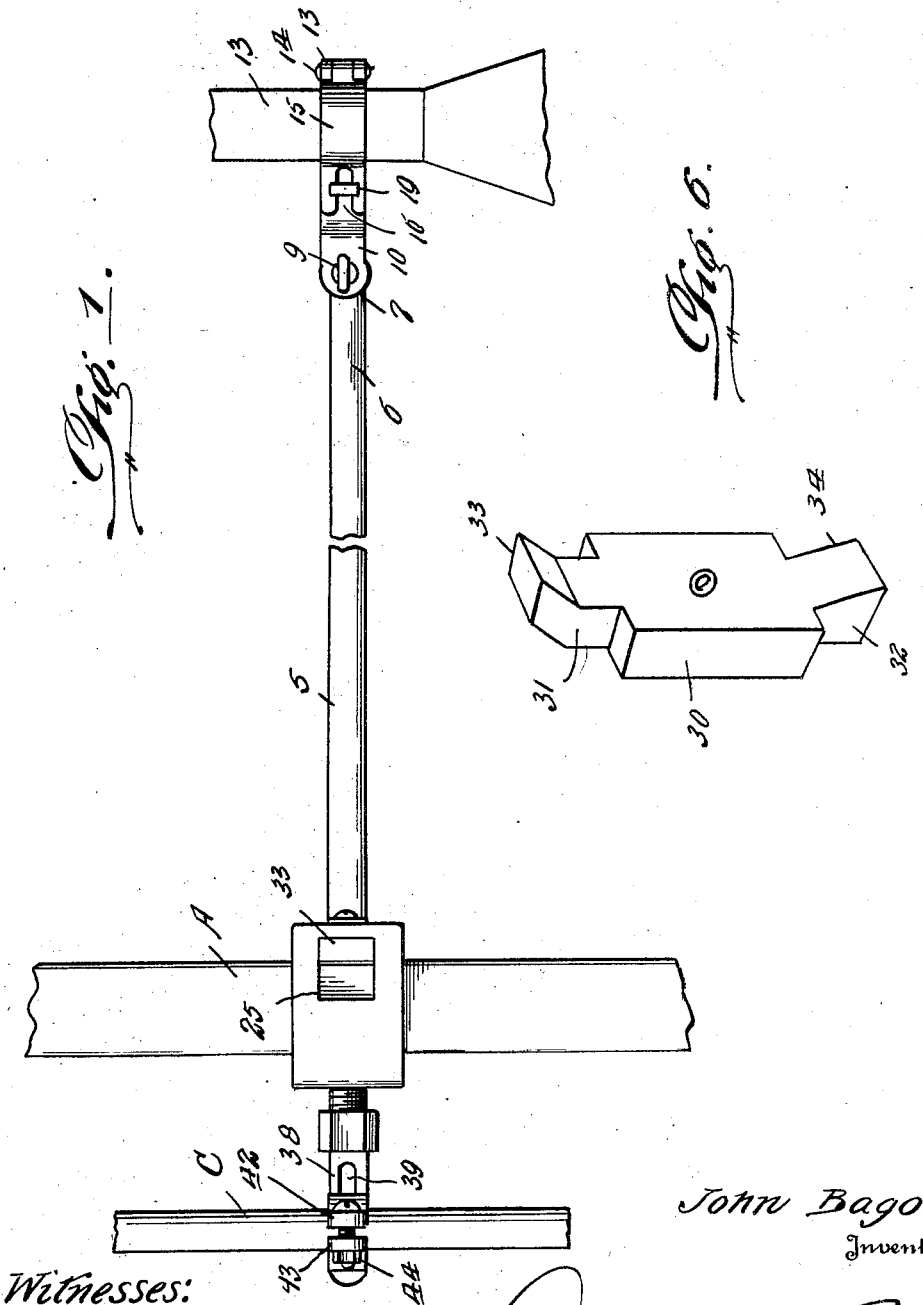

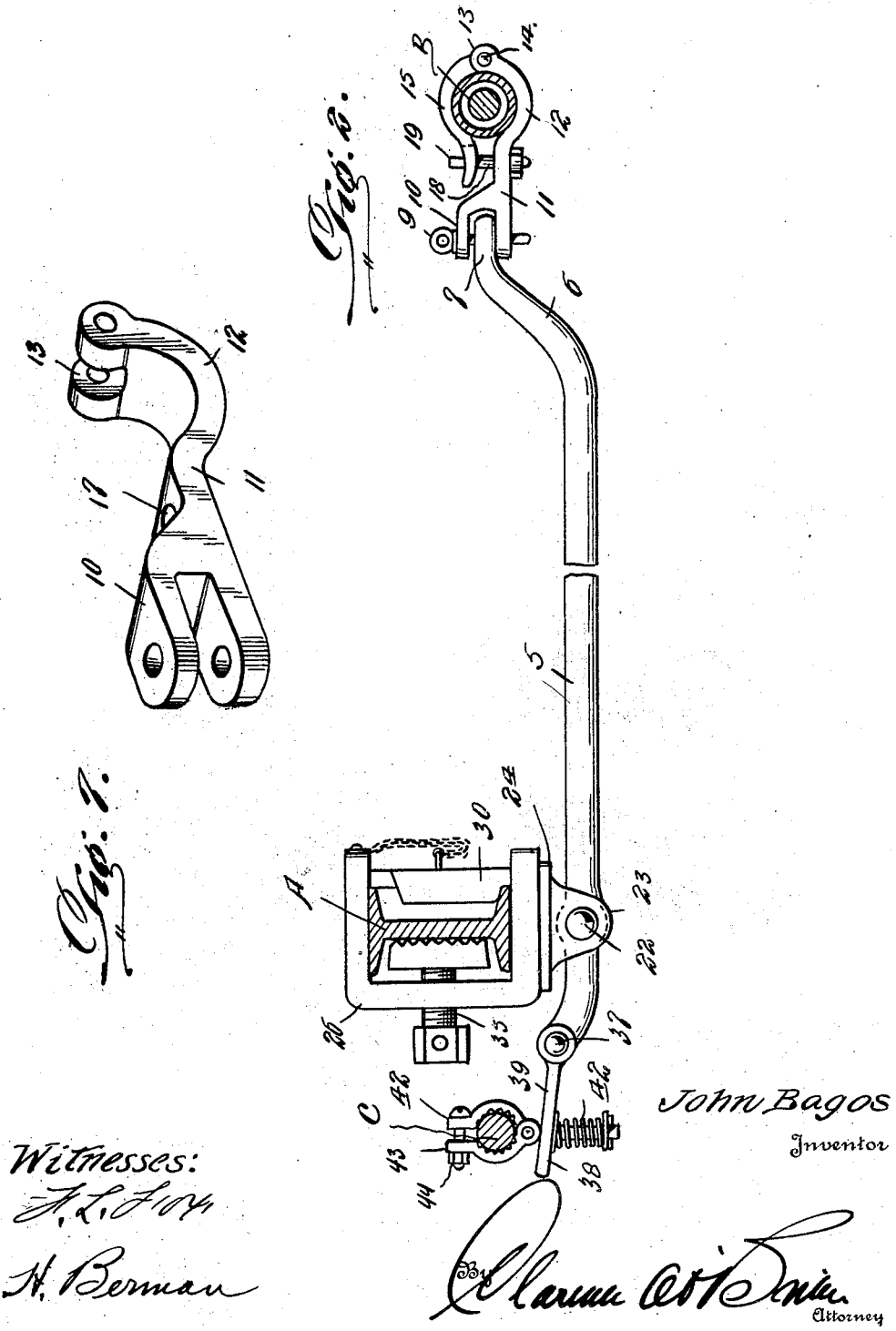

1,512,075

UNITED STATES PATENT OFFICE.

JOHN BAGOS, OF MACDONALDTON, PENNSYLVANIA.

VEHICLE DRAWBAR.

Application filed February 23, 1922. Serial No. 620,747.

*To all whom it may concern:*

Be it known that I, JOHN BAGOS, a citizen of the United States, residing at Macdonaldton, in the county of Somerset and State of Pennsylvania, have invented certain new and useful Improvements in Vehicle Drawbars, of which the following is a specification.

My invention relates to improvements in draw bars for vehicles, the primary object thereof residing in the provision of such a device that may be adjustably secured at its opposite ends to the front and rear axles respectively, of a pair of motor vehicles for permitting one vehicle to tow the other, without the usual necessity of employing a driver to steer the vehicle being towed, the nature of my draw bar being such as to effectively control the steering mechanism of the towed vehicle.

A further object of my invention resides in the provision of a draw bar for vehicles that is substantially simple of construction, and one that may be easily attached between a pair of vehicles, the same including relatively few parts, and these so corelated as to reduce the liability of derangement to a minimum.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a top plan view of my improved draw bar positioned between a front and rear vehicle.

Figure 2 is a side elevational view thereof applied.

Figure 3 is a cross sectional view of the end of the draw bar attached to the front axle of the vehicle to be towed and clearly disclosing an improved form of clamp member adapted for securing the said bar to this axle.

Figure 4 is a cross sectional view of the front end of the said draw bar.

Figure 5 is a plan view of the opposite end of the bar with the axle securing clamp removed, and Figure 6 is a perspective of the removable element of the clamp for the front axle of the vehicle to be towed.

Referring to the drawings in detail, A designates the front axle of the vehicle to be towed, while B designates the rear axle of the towing vehicle.

My draw bar, per se, constitutes the provision of a relatively elongated rod 5, the front end thereof being slightly bent upwardly as at 6, and thence forwardly and flattened as at 7, this flattened end being formed with an opening 8. Pivotally and removably secured to this front end of the said rod 5 through the instrumentality of a coupling pin 9 is the yoked end 10 of a link 11 of a formation, more clearly shown in Figure 7. The front end of this link is curved downwardly as at 12, the extreme end thereof being bifurcated as at 13, and pivotally secured as at 14 to this bifurcated end of the link is a swinging clamp plate 15, the front end thereof being slotted as at 16. As shown in several of the views, the curved end of the link 11 is adapted for positioning between the said rear axle B of the towing machine, after which the clamping plate 15 may be swung upon its pivot 14 upon the top side of the axle. Positioned within an opening 17 of the said link 11 is a bolt 18, screw threaded at its lower end, and formed with a transverse head 19 upon its upper end, this head adapted for projection through the said slot 16 in the clamp plate 15, after which, the same is turned at right angles to the plate for maintaining the same locked upon the axle.

Adjacent the rear end of the said rod 5, the same is flattened as at 20, and formed with an opening 21. Pivotally secured through the instrumentality of a pivot pin 22 to this flattened portion of the said rod 5 are the spaced pendant ears 23 formed upon a plate 24. Swivelly connected as at 25 to this plate 24 is a U-shaped clamp member 26, the same adapted as more clearly shown in Figures 2 and 3, to engage over the said front axle A of the vehicle to be towed. The upper and lower walls of this clamp 26 are slotted adjacent their front ends as at 27 and 28, respectively, the opposite ends of the slot 27 being inclined as more clearly shown in Figure 3, while the front end of the said slot 28 is also slightly inclined as shown in this figure. In conjunction with this clamp 26, is employed a removable locking plate 29, Figure 6. This locking plate includes a substantially rectangular body portion 30 formed upon its upper and lower ends with heads 31 and 32, respectively, the upper end of the said head 31 being forwardly inclined as at 33, while the front surface of the lower head 32 is inclined as at 34. After the clamp 26 has been positioned upon the axle A, the upper head 31 is projected through the said opening 27 in the clamp 26, and forced forwardly therethrough, after which the clamp may be swung inwardly and the head 32 positioned within the other opening 28 of the said clamp 26. Screw threadedly disposed within an opening in the rear wall of the clamp 26 is a headed bolt 35, the front end of which has swivelly connected thereto, a locking wedge plate 36, the same being adapted to be forcibly engaged with the inner face of the axle A for firmly maintaining the clamp in position.

Pivotally secured as at 37 to the extreme rear end of the rod 5, is a link 38, longitudinally slotted at 39. Engaging through the said slot 39 in the link 38 is a pin 40, the lower end of which carries a removable washer 41, while the upper end is formed with a clamp section 42. Cooperating with this clamp section 42 is a swinging clamp section 43, the said sections 42 and 43 adapted for positioning over the usual connecting rod C of the machine to be towed and to be secured thereon by a bolt connection 44. Encircling this pin 40 and between the said washer 41 and the link 38 is a coiled spring 42 for maintaining this link 38 in a position against the clamp sections 43, which will consequently overcome any strain upon the said pin 40, the purpose of the link 38 being to permit the rod 5 to swing upon its pivot 22 without effecting the connection to the said connecting rod C of the steering mechanism.

In view of the above description, it will be at once apparent that when my draw bar is connected between two machines in a manner shown, a turning of the front machine will consequently cause a lateral pivotal movement of the rod 5 upon the clamp 26, this movement effecting the pin 40 and clamp sections 42 and 43, for consequently actuating the connecting rod C of the steering mechanism of the machine being towed for consequently guiding this machine in the exact path of travel of the towing machine.

Although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent is:

In a vehicle draw bar coupling, a U-shaped clamp member adapted to be applied to an axle and provided at one end with a slot and at its opposite end with an opening, the said slots and openings adapted to be disposed at the same side of the axle, the slot and opening having bevelled forward side surfaces, a locking plate adapted to bridge the space between the ends of the said U-shaped clamp member, and provided at its end with head portions adapted to enter the slot and the opening respectively, said head portion having bevelled surfaces adapted to bear against the bevelled edges of the head and opening respectively, the plate having shoulder portions adjacent the inner ends of the head portion, the shoulder portion at one end of the plate being spaced from the end of the head for a greater distance than the shoulders at the opposite end thereof from the adjacent head, and means for pivotally connecting a coupling bar to the clamp member.

In testimony whereof I affix my signature.

JOHN BAGOS.